US012385568B2

(12) United States Patent
Forster et al.

(10) Patent No.: US 12,385,568 B2
(45) Date of Patent: Aug. 12, 2025

(54) FLOW PLATE ASSEMBLY AND METHOD OF CONTROLLING FLOW OF A FLUID

(71) Applicant: DEERE & COMPANY, Moline, IL (US)

(72) Inventors: Jonathan D. Forster, Wann, OK (US); Jacob E. Morris, Oolagah, OK (US)

(73) Assignee: Deere & Company, Moline, IL (US)

( * ) Notice: Subject to any disclaimer, the term of this patent is extended or adjusted under 35 U.S.C. 154(b) by 107 days.

(21) Appl. No.: 18/460,907

(22) Filed: Sep. 5, 2023

(65) Prior Publication Data
US 2025/0075798 A1 Mar. 6, 2025

(51) Int. Cl.
F16K 1/36 (2006.01)
F16K 17/04 (2006.01)

(52) U.S. Cl.
CPC ............ F16K 1/36 (2013.01); F16K 17/0413 (2013.01); F16K 17/0493 (2013.01); F16K 2200/3051 (2021.08)

(58) Field of Classification Search
CPC .... F16K 17/0413; F16K 1/36; F16K 17/0493; F16K 2200/3051; F15D 1/025; F16L 55/02781; Y10T 137/7847; Y10T 137/7848
USPC .................. 138/40, 43, 44, 45, 46; 251/120; 267/158–165
See application file for complete search history.

(56) References Cited

U.S. PATENT DOCUMENTS

| | | | | |
|---|---|---|---|---|
| 2,318,962 A | * | 5/1943 | Parker ................... | F16K 15/026 137/513.3 |
| 2,423,592 A | * | 7/1947 | Foster ................... | F01M 13/023 123/572 |
| 3,598,389 A | * | 8/1971 | Kohler ................. | F04B 39/1053 267/161 |
| 3,805,827 A | * | 4/1974 | Kennedy ................. | F16K 15/12 137/516.21 |
| 5,174,330 A | * | 12/1992 | Golestan .............. | G05D 7/0133 137/504 |

(Continued)

FOREIGN PATENT DOCUMENTS

| | | |
|---|---|---|
| CN | 100430622 C | 11/2008 |
| CN | 103883664 A | 6/2014 |
| JP | 55078866 A * | 6/1980 |

OTHER PUBLICATIONS

German Search Report issued in application No. 102024117033.6 dated Apr. 3, 2025, 08 pages.

Primary Examiner — Jessica Cahill
(74) Attorney, Agent, or Firm — Lucian Wayne Beavers; Patterson Intellectual Property Law, PC

(57) ABSTRACT

A flow plate assembly for installation in a housing defines a flow axis of a fluid therethrough and has a flow plate portion. The assembly includes a cap having a cap surface and a cap opening having a cap opening diameter. The assembly further includes a spring having at least one spring opening configured to allow the fluid to flow therethrough. The assembly further includes a flow plate having a flow plate surface and a flow plate central opening having a flow plate central opening diameter that is less than the cap opening diameter and at least one flow plate outer opening that is disposed radially outside of the cap opening such that the fluid flows through the at least one flow plate outer opening upon compression of the spring and movement of the flow plate surface away from the cap surface.

16 Claims, 5 Drawing Sheets

(56) References Cited

U.S. PATENT DOCUMENTS

| | | | | |
|---|---|---|---|---|
| 6,823,892 B1* | 11/2004 | Knapp | ................. | F16K 15/148 137/854 |
| 2013/0032115 A1* | 2/2013 | Zitarosa | .............. | F16K 17/0493 123/188.8 |
| 2014/0345706 A1* | 11/2014 | Maibaum | ............ | F16K 27/0209 137/543.17 |
| 2018/0245508 A1* | 8/2018 | Tomoda | ................... | F16C 3/28 |

* cited by examiner

FLOW PLATE ASSEMBLY AND METHOD OF CONTROLLING FLOW OF A FLUID

BACKGROUND

A flow orifice has an opening diameter that is sized to restrict or otherwise control flow and/or other characteristics of a fluid, such as an oil or another lubricant in non-limiting examples. The flow orifice may be formed in a flow plate that is positioned in or formed with a tube, passageway, or other housing configured to receive or allow flow of the fluid therethrough. In some systems, such as certain engine systems, hydraulic systems, or electric or mechanical powertrain systems, the flow and other characteristics of the fluid may vary based on system operation, temperature and/or pressure of the fluid, system components, and/or surrounding or local environment.

SUMMARY

According to an aspect of the present disclosure, a flow plate assembly for installation in a housing defines a flow axis of a fluid therethrough and has a flow plate portion. The assembly includes a cap configured for positioning at the flow plate portion of the housing and comprising a cap surface and a cap opening having a cap opening diameter; a spring configured for positioning at the flow plate portion of the housing and comprising at least one spring opening configured to allow the fluid to flow therethrough; a flow plate disposed between the cap and the spring and comprising a flow plate surface and a flow plate central opening having a flow plate central opening diameter that is less than the cap opening diameter and at least one flow plate outer opening that is disposed radially outside of the cap opening such that the fluid flows through the at least one flow plate outer opening upon compression of the spring and movement of the flow plate surface away from the cap surface.

The spring may further include a spring central opening radially aligned with the flow plate central opening. The at least one spring opening may include a plurality of spring openings that are diametrically opposed around the spring central opening. The spring may comprise a spring plate configured to bias the flow plate surface toward the cap surface. The cap surface may extend radially outward. The flow plate surface may extend radially outward. The at least one flow plate outer opening may comprise a plurality of flow plate outer openings that are diametrically opposed around the flow plate central opening. The at least one flow plate outer opening may be disposed radially outside of the cap opening to prevent flow of the fluid through the at least one flow plate outer opening upon the spring biasing the flow plate surface into contact with the cap surface. The fluid may flow through the at least one flow plate outer opening upon compression of the spring by the fluid acting on the flow plate surface. The cap, the spring, and the flow plate may be configured to be positioned in the flow plate portion having a flow plate portion diameter that is greater than a housing inner diameter of the housing. The cap may comprise an axially extending portion, and the spring and the flow plate may be axially aligned with the axially extending portion. The spring plate and the flow plate may be disposed within the axially extending portion of the cap. The spring and the flow plate may be configured to be axially positioned between the housing and the cap surface of the cap.

According to an aspect of the present disclosure, a method of controlling flow of a fluid through a housing includes metering flow of the fluid through a cap opening of a cap and a flow plate central opening of a flow plate disposed in a flow plate portion of the housing and comprising a flow plate surface and at least one flow plate outer opening disposed radially outside of the cap opening; biasing the flow plate with a spring such that the flow plate surface contacts the cap surface of the cap to prevent flow of the fluid through the at least one flow plate outer opening; and compressing the spring and moving the flow plate surface away from the cap surface with the fluid acting on the flow plate surface such that the fluid flows through the at least one flow plate outer opening.

Metering flow of the fluid through the cap opening of the cap and the flow plate central opening of the flow plate may comprise metering flow of the fluid through the cap opening of the cap, the flow plate central opening, and a spring central opening. The method may further comprise flowing the fluid through a plurality of spring openings diametrically opposed around the spring central opening upon compressing the spring and moving the flow plate surface away from the cap surface. The method may further comprise flowing the fluid through a plurality of flow plate outer openings diametrically opposed around the flow plate central opening upon compressing the spring and moving the flow plate surface away from the cap surface. Compressing the spring and moving the flow plate surface away from the cap surface may comprise compressing the spring and moving the flow plate surface away from the cap surface upon an initial start of a fluid pump after a nonoperational period of the fluid pump. Compressing the spring and moving the flow plate surface away from the cap surface may comprise compressing the spring and moving the flow plate surface away from the cap surface with the fluid being at a first fluid temperature. Biasing the flow plate with the spring such that the flow plate surface contacts the cap surface of the cap to prevent flow of the fluid may comprise biasing the flow plate with the spring such that the flow plate surface contacts the cap surface of the cap to prevent flow of the fluid being at a second fluid temperature that is less than the first fluid temperature. Compressing the spring and moving the flow plate surface away from the cap surface may comprise compressing the spring and moving the flow plate surface away from the cap surface with the fluid being at a first fluid pressure. Biasing the flow plate with the spring such that the flow plate surface contacts the cap surface of the cap to prevent flow of the fluid may comprise biasing the flow plate with the spring such that the flow plate surface contacts the cap surface of the cap to prevent flow of the fluid being at a second fluid pressure that is less than the first fluid pressure. Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
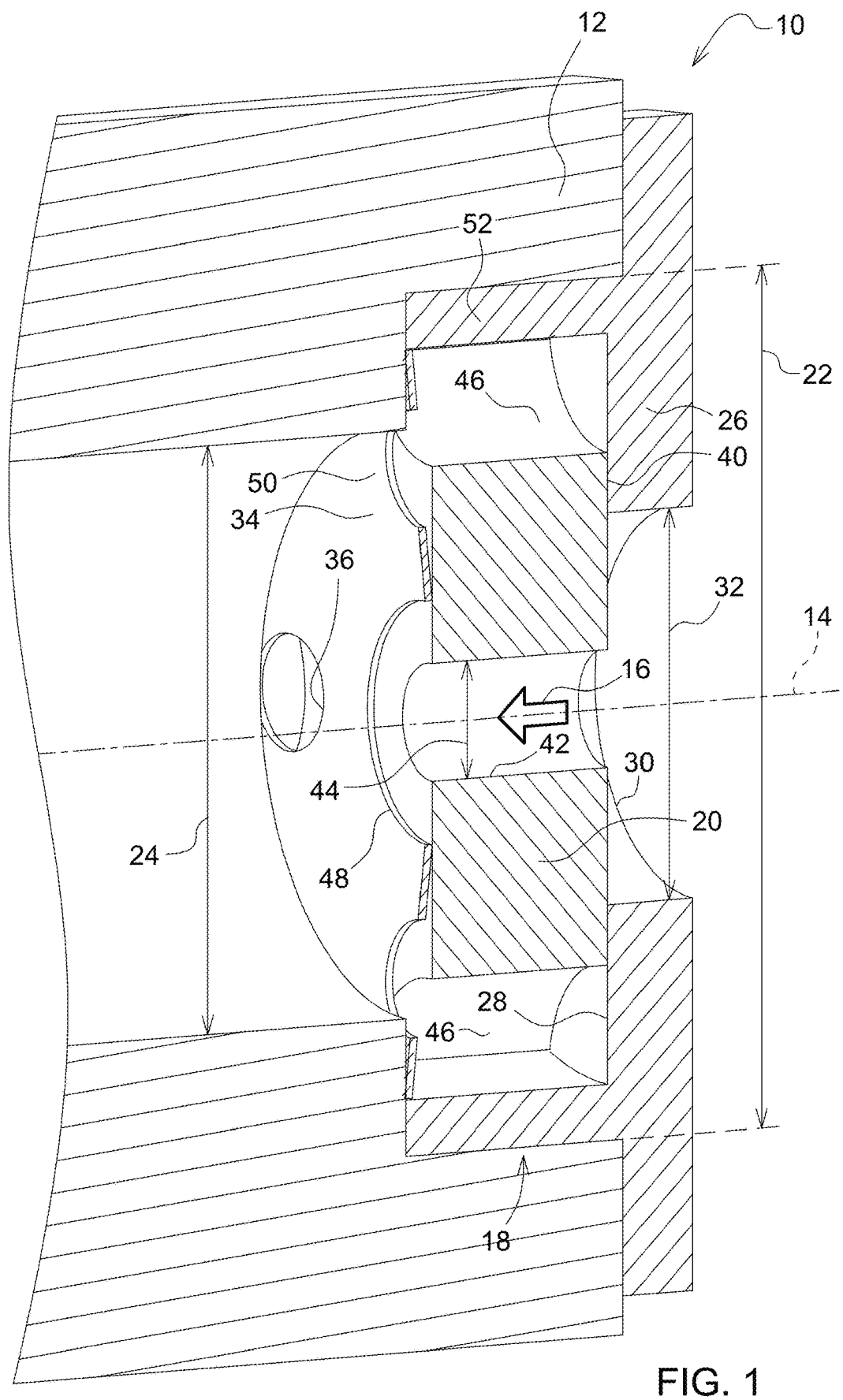
FIG. 1 is a radial cross-sectional view of a flow plate assembly in accordance with an embodiment of the present disclosure.

Referring to FIG. 1, a cross sectional view of a flow plate assembly 10 is illustrated in accordance with an embodiment of the present disclosure. The assembly 10 in FIG. 1 is installed or otherwise positioned in a housing 12, such as a pipe, tube, conduit, or other passageway in non-limiting examples, that defines a flow axis 14 of a fluid 16 through the housing 12. The fluid 16 in one or more embodiments includes an oil, coolant, lubricant, fuel, and/or another liquid or other fluid. The fluid 16 in the illustrated embodiment is an oil or other lubricant having a fluid viscosity that decreases with an increase of a fluid temperature of the fluid 16.

The housing 12 of the embodiment illustrated in FIG. 1 includes a flow plate portion 18. The housing 12 includes a housing inner diameter 24 as shown in FIG. 1. The flow plate portion 18 is positioned at an end of the housing 12 in FIG. 1 but may be located elsewhere in or at the housing 12 in additional embodiments. The flow plate portion 18 defines a location for a flow plate 20 or orifice for the fluid 16 flowing through the housing 12. The flow plate portion 18 has a flow plate portion diameter 22 that is greater than the housing inner diameter 24 of the housing 12.

The assembly 10 includes a cap 26 configured for positioning at the flow plate portion 18 of the housing 12. The cap 16 includes a cap surface 28 and a cap opening 30 having a cap opening diameter 32. The cap surface 28 extends radially in the illustrated embodiment.

Figure 2:
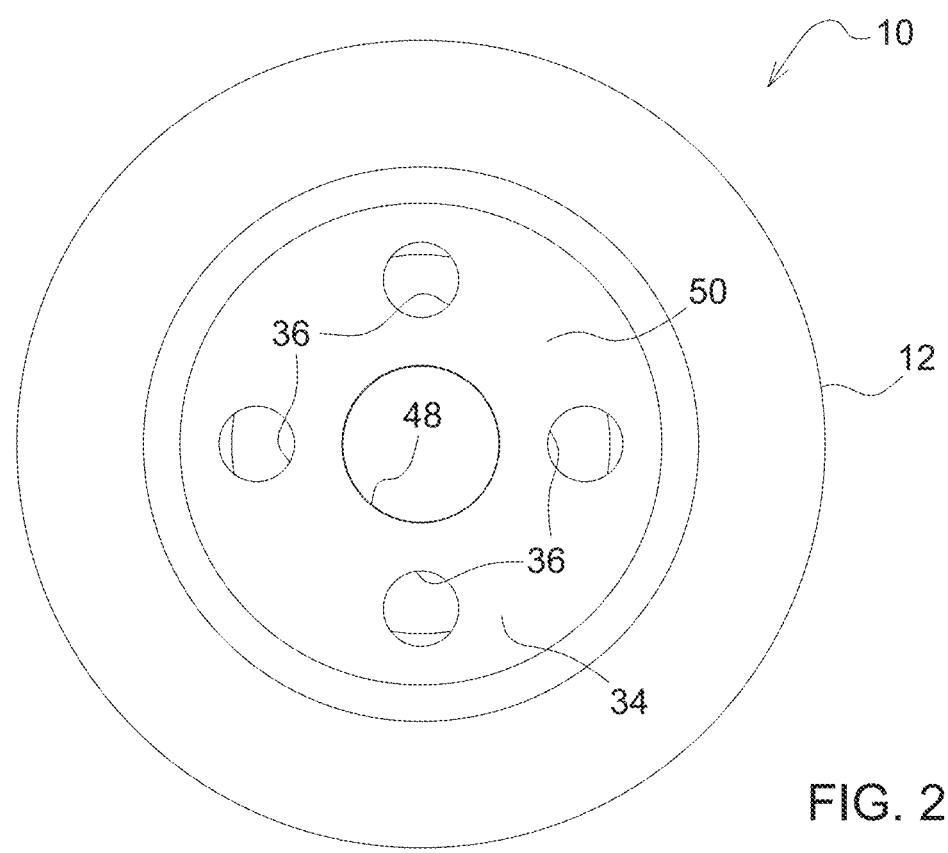
FIG. 2 is an axial cross-sectional view of a flow plate assembly in accordance with an embodiment of the present disclosure.

Referring now to FIG. 2 with continuing reference to FIG. 1, the assembly 10 further includes a spring 34 configured for positioning at the flow plate portion 18 of the housing 12. As shown in FIG. 1, the spring 34, the flow plate 20, and the cap 26 are arranged in a stack configuration and/or positioned against and/or adjacent to each other in accordance with certain embodiments. In additional embodiments not illustrated, two or more of the spring 34, the flow plate 20, and the cap 26 may be spaced from each other and/or separated from each other, such as with a separating part that is included with the assembly 10, and/or one or more of the spring 34, the flow plate 20, and the cap 26 may be duplicated, removed, and/or combined, integrated, or formed with any other part(s) or element(s) of the assembly 10 to form an embodiment of the present disclosure.

FIG. 2 is an axial cross-section view illustrating the spring 34. The spring 34 includes one or more spring openings 36 configured to, sized to, positioned to, or otherwise that allow the fluid 16 to flow through the spring 34. The spring 34 illustrated in FIG. 2 includes four spring openings 36 but may include less than four spring openings 36 or greater than four spring openings 36 in additional embodiments not illustrated. The spring 34 illustrated in FIG. 2 includes round spring openings 36 but may include one or more spring openings 36 that are square, slotted, ovoid, or shaped alternatively or open to an outer edge of the spring 34 in additional embodiments not illustrated.

Figure 3:
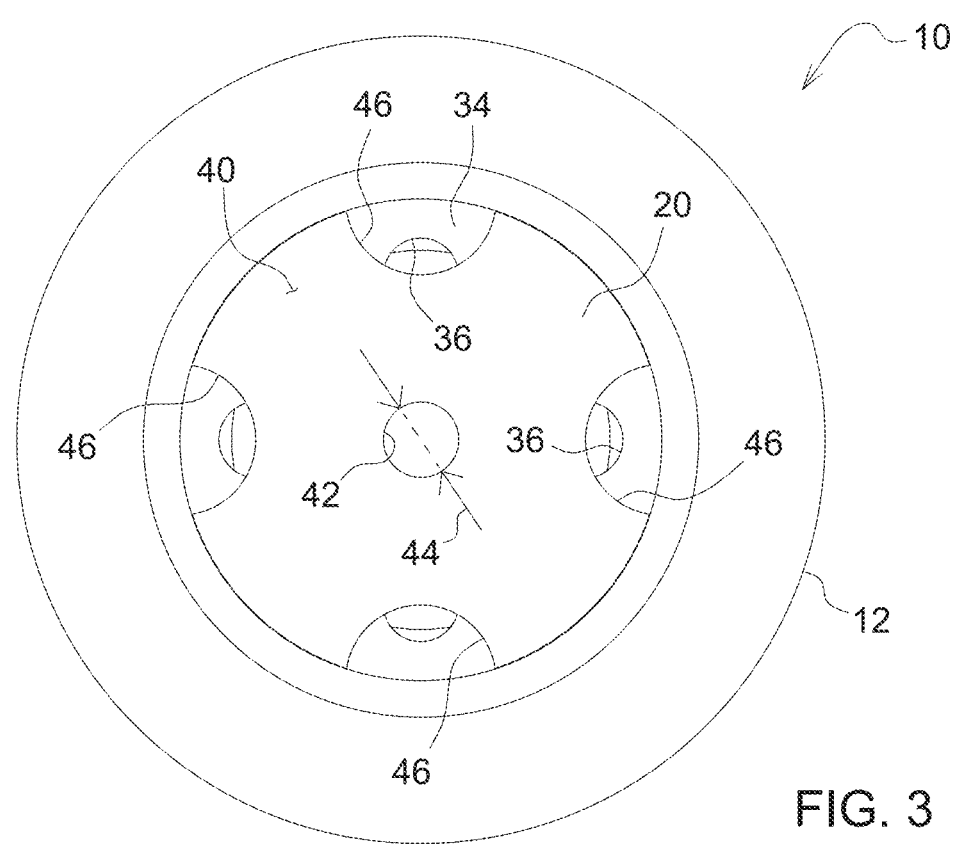
FIG. 3 is an axial cross-sectional view of a flow plate assembly in accordance with an embodiment of the present disclosure.

FIG. 3 is an axial cross-section view of the assembly 10 illustrating a flow plate 20 disposed between the cap 26 and the spring 34. The flow plate 20 includes a flow plate surface 40. The flow plate surface 40 extends radially outward in the illustrated flow plate central opening diameter 44. In the illustrated embodiment, the flow plate central opening diameter 44 is less than the cap opening diameter 32. The flow plate central opening 42 is an orifice in the illustrated embodiment such that fluid 16 flow is controlled in accordance with the flow plate central opening diameter 44.

The cap 26, the spring 34, and the flow plate 20 are configured to be positioned in the flow plate portion 18 of the housing 12 as shown in FIG. 1. In the illustrated embodiment, the cap 26 includes an axially extending portion 52, and the spring 34 and the flow plate 20 are axially aligned with the axially extending portion 52 of the cap 26. In the embodiment shown in FIG. 1, the spring 34 and the flow plate 20 are disposed within the axially extending portion 52 of the cap 26. The spring 34 and the flow plate 20 are configured to be axially positioned between the housing 12 and the cap surface 28 of the cap 26 in an embodiment.

The spring 34 further includes a spring central opening 48 in the illustrated embodiment that is concentric with, radially aligned, or at least partially radially overlapping with the flow plate central opening 42. In the illustrated embodiment of FIG. 2, the spring opening(s) 36 include multiple spring openings 36 that are diametrically opposed around the spring central opening 48.

The flow plate 20 further includes one or more flow plate outer openings 46 disposed radially outside of the cap opening 30. The flow plate outer opening(s) 46 include multiple flow plate outer openings 46 that are diametrically opposed around the flow plate central opening 42 in the illustrated embodiment of FIG. 3. As explained in further detail below and shown in FIG. 5, upon compression of the spring 34 and movement of the flow plate surface 40 away from the cap surface 28, the fluid 16 flows through the flow plate outer opening(s) 46.

The flow plate 20 illustrated in FIG. 3 includes four flow plate outer openings 46 but may include less than four flow plate outer openings 46 or greater than four flow plate outer openings 46 in additional embodiments not illustrated. The flow plate outer openings 46 of the flow plate 20 illustrated in FIG. 3 are arched and open to the outer edge of the flow plate 20 but may include one or more flow plate outer openings 46 that are square, slotted, ovoid, or shaped alternatively or not open to the outer edge of the flow plate 20 in additional embodiments not illustrated.

Figure 4:
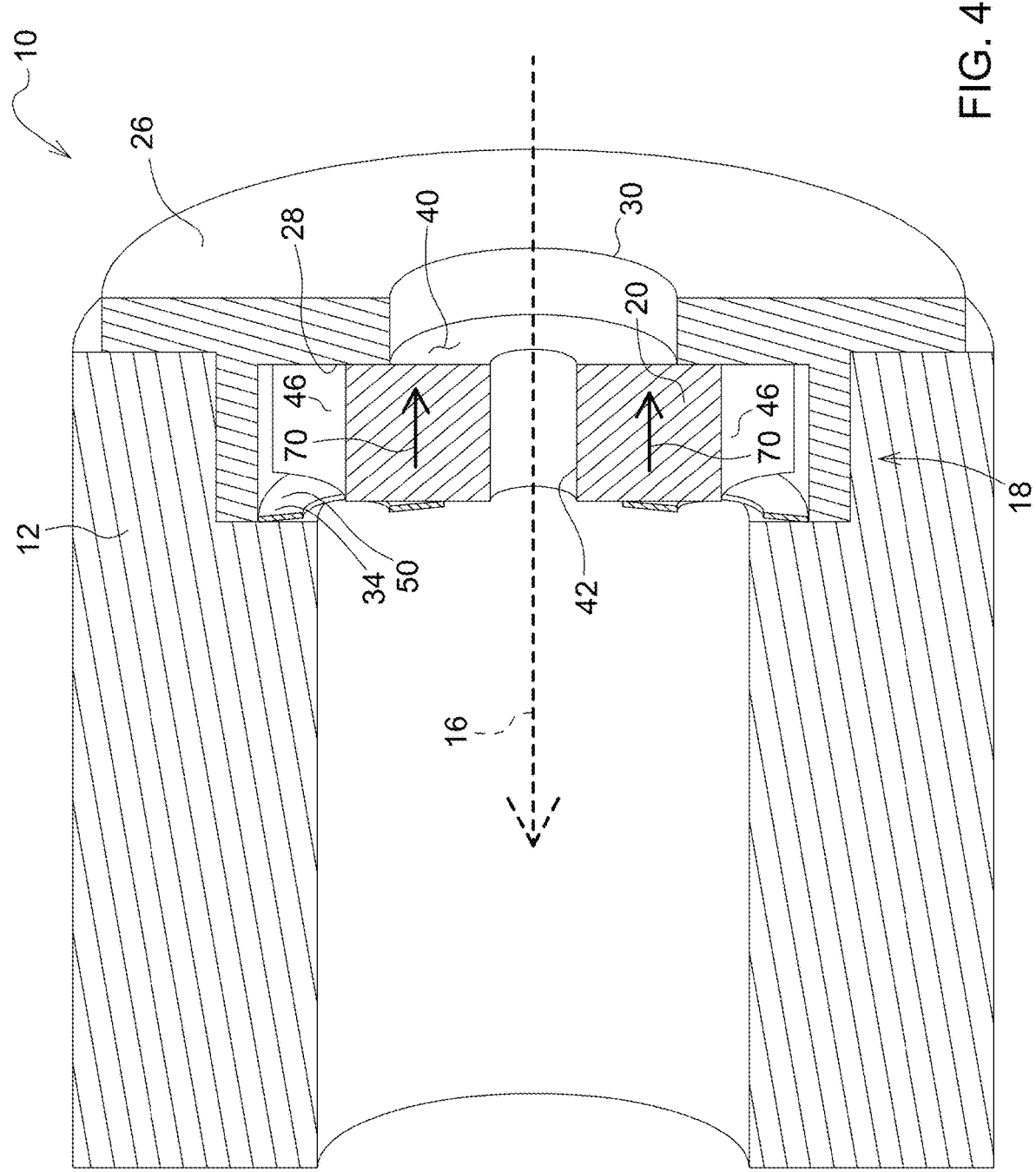
FIG. 4 is a radial cross-sectional view of a flow plate assembly in accordance with an embodiment of the present disclosure.

As shown in FIG. 4, the spring 34 of an embodiment includes a spring plate 50 configured to push, urge, force, or bias the flow plate 20 and/or the flow plate surface 40, as indicated by arrows 70, toward the cap 26 and/or the cap surface 28. In an embodiment, the spring plate 50 is a Belleville or spring washer that may be modified in accordance with the features of the spring 34 described in embodiments herein. The flow plate outer opening(s) 46 is/are disposed radially outside of the cap opening 30 to prevent flow of the fluid 16 through the flow plate outer opening(s) 46 upon the spring 34 biasing the flow plate surface 40 into contact with the cap surface 28. The spring 34 of one or more embodiments exerts a force upon the flow plate 20 to seal, close, or at least reduce the separation distance between the flow plate 20 and the cap 26 at the cap surface 28 and/or prevent or at least reduce flow of the fluid 16 between the flow plate 20 and the cap surface 28.

Figure 5:
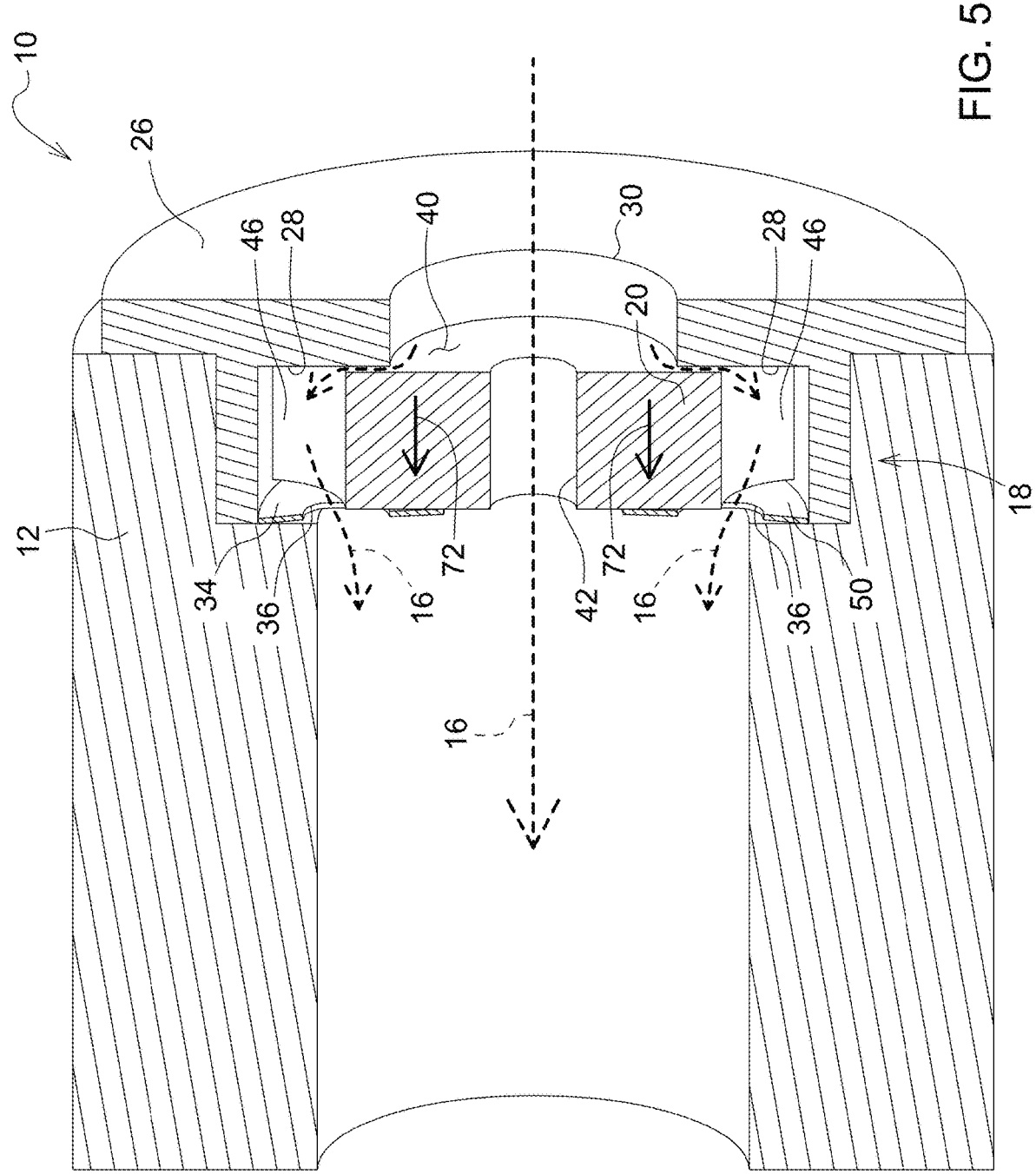
FIG. 5. is a radial cross-sectional view of a flow plate assembly in accordance with an embodiment of the present disclosure.

As shown in FIG. 5, when the fluid 16 flows against the flow plate surface 40, pressure is applied by the fluid 16 against the flow plate 20 at the flow plate surface 40 to move the flow plate 20 in a direction of the flow of the fluid 16, as indicated by arrows 72, against the force of the spring 34. Upon compression of the spring 34 by the fluid 16 acting on the flow plate surface 40, the fluid 16 flows through the flow plate outer opening(s) 46.

Figure 6:
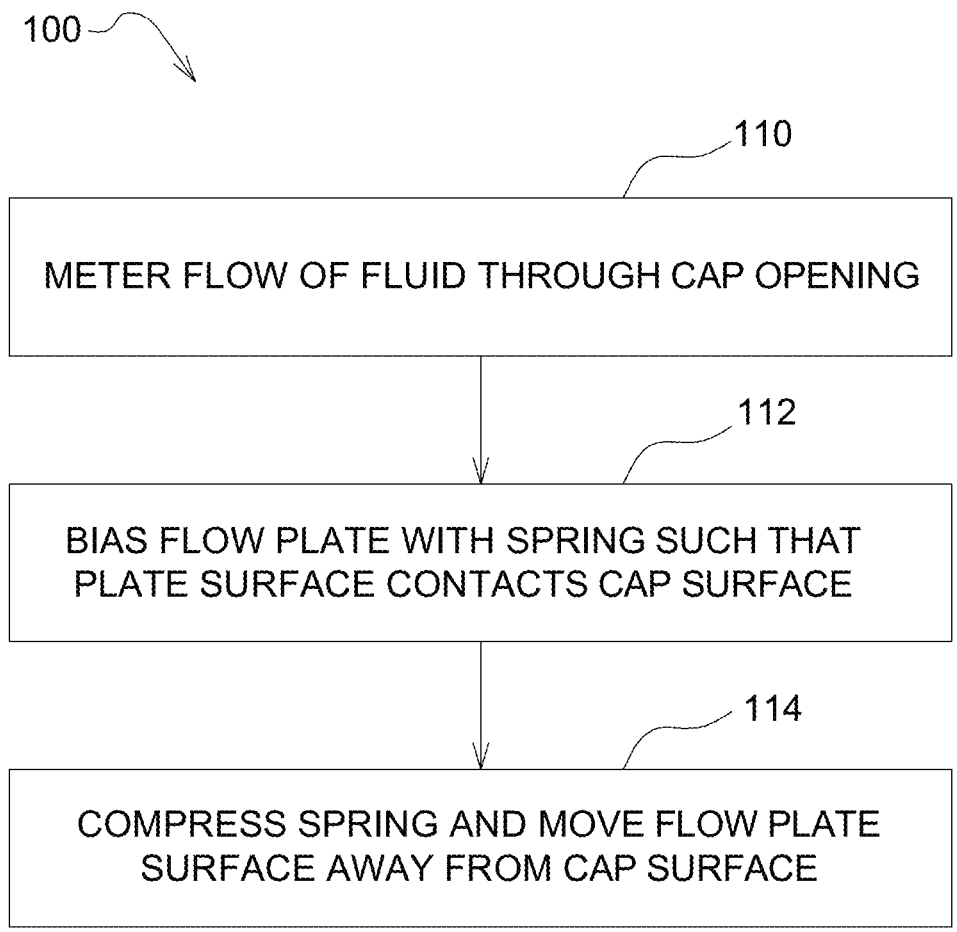
FIG. 6 illustrates a method of controlling flow of a fluid in accordance with an embodiment of the present disclosure.

FIG. 6 illustrates a method 100 of controlling flow of the fluid 16 through the housing 12 in accordance with an embodiment of the present disclosure. The method 100 includes metering flow, at step 110, of the fluid 16 through the cap opening 30 of the cap 26 and the flow plate central opening 42 of the flow plate 20 disposed in the flow plate portion 18 of the housing 12. Metering flow of the fluid 16 through the cap opening 30 of the cap 26 and the flow plate central opening 42 of the flow plate 20 includes metering flow of the fluid 16 through the cap opening 30 of the cap 26, the flow plate central opening 42, and the spring central opening 48 in the illustrated embodiment.

The method 100 further includes biasing the flow plate 20, at step 112, with the spring 34 such that the flow plate surface 40 contacts the cap surface 28 of the cap 26 to prevent flow of the fluid 16 through the flow plate outer opening(s) 46.

The method 100 further includes compressing the spring 34, at step 114, and moving the flow plate surface 40 away from the cap surface 28 with the fluid 16 acting on the flow plate surface 40 such that the fluid 16 flows through the flow plate outer opening(s) 46. The method 100 of one or more embodiments further includes, upon compressing the spring 34 and moving the flow plate surface 40 away from the cap surface 28, flowing the fluid 16 through the spring opening(s) 36 diametrically opposed around the spring central opening 48. The method 100 of further embodiments includes, upon compressing the spring 34 and moving the flow plate surface 40 away from the cap surface 28, flowing the fluid 16 through the flow plate outer opening(s) 46 diametrically opposed around the flow plate central opening 42. In one or more embodiments, compressing the spring 34 and moving the flow plate surface 40 away from the cap surface 28 includes compressing the spring 34 and moving the flow plate surface 40 away from the cap surface 28 upon an initial start of a fluid pump (not shown) after a nonoperational period of the fluid pump, upon an initial startup of an internal combustion engine after a shutdown period of the engine, or otherwise upon the beginning of flow of the fluid 16 through the housing 12.

The method 100 of an embodiment includes compressing the spring 34 and moving the flow plate surface 40 away from the cap surface 28 with the fluid 16 being at a first fluid temperature, and further includes biasing the flow plate 20 with the spring 34 when the fluid 16 is at a second fluid temperature that is greater than the first fluid temperature such that the flow plate surface 40 contacts the cap surface 28 of the cap 26 to prevent flow of the fluid 16 between the flow plate surface 40 and the cap surface 28.

The method 100 of an embodiment includes compressing the spring 34 and moving the flow plate surface 40 away from the cap surface 28 with the fluid 16 being at a first fluid pressure, and further includes biasing the flow plate 20 with the spring 34 when the fluid 16 is at a second fluid pressure that is less than the first fluid pressure such that the flow plate surface 40 contacts the cap surface 28 of the cap 26 to prevent flow of the fluid 16 between the flow plate surface 40 and the cap surface 28.

Without in any way limiting the scope, interpretation, or application of the claims appearing below, a technical effect of one or more of the example embodiments disclosed herein is the assembly 10 and the method 100 providing a simple pressure-activated variable flow orifice that may require minimal space and may be retrofitted in existing lubrication systems. The assembly 10 and the method 100 may eliminate the need for pressure relief devices, thermal bypass and other types of valves, additional fluid circuitry, and other controls and components to reduce the number of parts, size, weight, and complexity of the system, and overall cost of the system. The assembly 10 and the method 100 of various embodiments permits flexibility to allow greater or less flow of the fluid 16 by adjusting the number, location, and size of any one or more openings and/or the size, material, and configuration of the spring 34 to meet a desired flow of the fluid 16 based on system requirements across various operating conditions, including varying temperatures, pressures, flows, and compositions of the fluid 16 and the surrounding system and environment.

In a non-limiting example, the assembly 10 and the method 100 may be utilized in a lubrication system for one or more electric machines in an electric powertrain vehicle. In the example, cold lubricant is more viscous and resistant to flow, but higher lubricant flow is beneficial during a cold start operation in order to increase flow of the fluid 16 to the electric machine(s) to be heated more quickly by the electric machine(s) and enable faster warmup of the system. The assembly 10 and the method 100 allow the flow plate 20 to move, open the flow plate outer opening(s) 46, and allow a higher flow of the fluid 16 when the higher pressure and viscosity lubricant interacts with the flow plate 20. Once the fluid 16 has reached the higher temperature, the spring 34 moves the flow plate 20 to restrict flow of the fluid 16 to flow only or primarily through the flow plate central opening 42 acting as a standard flow orifice.

Any structure, feature, function, or step described or shown for any embodiments of the assembly 10 herein is further included as a structure, feature, function, or step in one or more embodiments of the method 100 of the present disclosure. Any structure, feature, function, or step described or shown for any embodiments of the method 100 herein is further included as a structure, feature, function, or step in one or more embodiments of the assembly 10 of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A flow plate assembly for installation in a housing defining a flow axis of a fluid therethrough and having a flow plate portion, the assembly comprising:
   a cap configured for positioning at the flow plate portion of the housing and comprising a cap surface and a cap opening having a cap opening diameter;
   a spring configured for positioning at the flow plate portion of the housing and comprising at least one spring opening configured to allow the fluid to flow therethrough; and
   a flow plate disposed between the cap and the spring and comprising a flow plate surface and a flow plate central opening having a flow plate central opening diameter that is less than the cap opening diameter and at least one flow plate outer opening that is disposed radially outside of the cap opening such that the fluid flows through the at least one flow plate outer opening upon compression of the spring and movement of the flow plate surface away from the cap surface;
   wherein the spring includes a spring plate configured to bias the flow plate surface toward the cap surface and the spring plate includes a spring plate central opening axially aligned with the flow plate central opening so that fluid which flows through the flow plate central opening also flows through the spring plate central opening.

2. The assembly of claim 1, wherein the at least one spring opening comprises a plurality of spring openings that are diametrically opposed around the spring central opening.

3. The assembly of claim 1, wherein the cap surface extends radially outward.

4. The assembly of claim 1, wherein the flow plate surface is a planar surface extending radially outward.

5. The assembly of claim 1, wherein the at least one flow plate outer opening comprises a plurality of flow plate outer openings that are diametrically opposed around the flow plate central opening.

6. The assembly of claim 1, wherein the at least one flow plate outer opening is disposed radially outside of the cap opening to prevent flow of the fluid through the at least one flow plate outer opening upon the spring biasing the flow plate surface into contact with the cap surface.

7. The assembly of claim 1, wherein the fluid flows through the at least one flow plate outer opening upon compression of the spring by the fluid acting on the flow plate surface.

8. The assembly of claim 1, wherein the cap, the spring, and the flow plate are configured to be positioned in the flow plate portion having a flow plate portion diameter that is greater than a housing inner diameter of the housing.

9. The assembly of claim 1, wherein the cap comprises an axially extending portion, and the spring and the flow plate are axially aligned with the axially extending portion.

10. The assembly of claim 1, wherein the spring and the flow plate are configured to be axially positioned between the housing and the cap surface of the cap.

11. The assembly of claim 1, wherein the spring plate is a Belleville washer having a smaller diameter end engaging the flow plate and a larger diameter end configured to engage the housing.

12. A flow plate assembly for installation in a housing defining a flow axis of a fluid therethrough and having a flow plate portion, the assembly comprising:
   a cap configured for positioning at the flow plate portion of the housing and comprising a cap surface and a cap opening having a cap opening diameter;
   a spring configured for positioning at the flow plate portion of the housing and comprising at least one spring opening configured to allow the fluid to flow therethrough; and
   a flow plate disposed between the cap and the spring and comprising a flow plate surface and a flow plate central opening having a flow plate central opening diameter that is less than the cap opening diameter and at least one flow plate outer opening that is disposed radially outside of the cap opening such that the fluid flows through the at least one flow plate outer opening upon compression of the spring and movement of the flow plate surface away from the cap surface;
   wherein the cap comprises an axially extending portion, and the spring and the flow plate are axially aligned with the axially extending portion; and
   wherein the spring plate and the flow plate are disposed within the axially extending portion of the cap.

13. A method of controlling flow of a fluid through a housing, the method comprising:
   metering flow of the fluid through a cap opening of a cap and a flow plate central opening of a flow plate disposed in a flow plate portion of the housing and comprising a flow plate surface and at least one flow plate outer opening disposed radially outside of the cap opening;
   compressing a spring and moving the flow plate surface away from the cap surface with the fluid being at a first fluid pressure and with the fluid acting on the flow plate surface such that the fluid flows in a first direction through both the flow plate central opening and the at least one flow plate outer opening; and
   biasing the flow plate with the spring such that the flow plate surface contacts the cap surface of the cap to prevent flow of the fluid through the at least one flow plate outer opening while allowing flow of fluid in the first direction to continue through the flow plate central opening with the fluid being at a second fluid pressure lower than the first fluid pressure;
   wherein metering flow of the fluid through the cap opening of the cap and the flow plate central opening of the flow plate comprises metering flow of the fluid through the cap opening of the cap, the flow plate central opening, and a spring central opening; and
   wherein the method further includes:
   flowing the fluid through a plurality of spring openings diametrically opposed around the spring central opening upon compressing the spring and moving the flow plate surface away from the cap surface.

14. The method of claim 13, further comprising flowing the fluid through a plurality of flow plate outer openings diametrically opposed around the flow plate central opening upon compressing the spring and moving the flow plate surface away from the cap surface.

15. The method of claim 13, wherein compressing the spring and moving the flow plate surface away from the cap surface comprises compressing the spring and moving the flow plate surface away from the cap surface upon an initial start of a fluid pump after a nonoperational period of the fluid pump.

16. The method of claim 13, wherein compressing the spring and moving the flow plate surface away from the cap surface comprises compressing the spring and moving the flow plate surface away from the cap surface with the fluid being at a first fluid temperature, and wherein biasing the flow plate with the spring such that the flow plate surface contacts the cap surface of the cap to prevent flow of the fluid comprises biasing the flow plate with the spring such that the flow plate surface contacts the cap surface of the cap to prevent flow of the fluid being at a second fluid temperature that is greater than the first fluid temperature.

\* \* \* \* \*